United States Patent
Fleck et al.

(10) Patent No.: US 12,459,051 B2
(45) Date of Patent: Nov. 4, 2025

(54) DEVICES, SYSTEMS, AND METHODS FOR INCREASED WEAR RESISTANCE DURING LOW TEMPERATURE FRICTION STIR PROCESSING

(71) Applicant: Mazak Corporation, Florence, KY (US)

(72) Inventors: Rodney Dale Fleck, Draper, UT (US); Russell J. Steel, Salem, UT (US)

(73) Assignee: Mazak Corporation, Florence, KY (US)

( * ) Notice: Subject to any disclaimer, the term of this patent is extended or adjusted under 35 U.S.C. 154(b) by 0 days.

(21) Appl. No.: 17/958,947

(22) Filed: Oct. 3, 2022

(65) Prior Publication Data

US 2023/0107348 A1    Apr. 6, 2023

Related U.S. Application Data

(63) Continuation of application No. 16/115,195, filed on Aug. 28, 2018, now Pat. No. 11,458,564.

(60) Provisional application No. 62/552,769, filed on Aug. 31, 2017.

(51) Int. Cl.
| | |
|---|---|
| *B23K 20/12* | (2006.01) |
| *B23K 20/233* | (2006.01) |
| *B23K 103/10* | (2006.01) |

(52) U.S. Cl.
CPC ........ *B23K 20/127* (2013.01); *B23K 20/1255* (2013.01); *B23K 20/129* (2013.01); *B23K 20/2333* (2013.01); *B23K 20/125* (2013.01); *B23K 2103/10* (2018.08)

(58) Field of Classification Search
None
See application file for complete search history.

(56) References Cited

U.S. PATENT DOCUMENTS

| | | |
|---|---|---|
| 6,648,206 B2 | 11/2003 | Nelson |
| 6,732,901 B2 | 5/2004 | Nelson |
| 6,779,704 B2 | 8/2004 | Nelson |
| 7,124,929 B2 | 10/2006 | Nelson |

(Continued)

FOREIGN PATENT DOCUMENTS

| | | |
|---|---|---|
| CN | 107378167 | 11/2017 |
| EP | 2792759 A1 | 10/2014 |

(Continued)

OTHER PUBLICATIONS

U.S. Appl. No. 12/392,030, filed Feb. 24, 2003, Babb Jonathan A.
(Continued)

*Primary Examiner* — Devang R Patel
(74) *Attorney, Agent, or Firm* — Fitch, Even, Tabin & Flannery LLP

(57) ABSTRACT

A method of friction stir processing (FSP) includes contacting a first workpiece with a FSP tool, where the first workpiece is a low-melting temperature metal or alloy and the FSP tool is a single-body FSP tool having a diamond working surface. The method also includes rotating the FSP tool in contact with the first workpiece at an interface and generating thermal energy at the interface to heat the first workpiece. The method further includes conducting thermal energy away from the interface with the FSP tool, and friction stirring the first workpiece at a temperature of the FSP tool below 800° C.

17 Claims, 5 Drawing Sheets

(56) References Cited

U.S. PATENT DOCUMENTS

| | | |
|---|---|---|
| 7,152,776 B2 | 12/2006 | Nelson |
| 7,225,968 B2 | 6/2007 | Packer |
| 7,270,257 B2 | 9/2007 | Steel |
| 7,494,040 B2 | 2/2009 | Babb |
| 7,530,486 B2 | 5/2009 | Flak |
| 7,608,296 B2 | 10/2009 | Packer |
| 7,651,018 B2 | 1/2010 | Packer |
| 7,661,572 B2 | 2/2010 | Nelson |
| 7,753,252 B2 | 7/2010 | Taylor |
| 7,845,545 B2 | 12/2010 | Packer |
| 7,909,231 B2 | 3/2011 | Babb |
| 7,992,759 B2 | 8/2011 | Steel |
| 7,993,575 B2 | 8/2011 | Nelson |
| 8,056,797 B2 | 11/2011 | Packer |
| 8,114,474 B1 | 2/2012 | Dudt |
| 8,157,154 B2 | 4/2012 | Packer |
| 8,186,561 B2 | 5/2012 | Allen |
| 8,241,556 B2 | 8/2012 | Rosal |
| 8,302,834 B2 | 11/2012 | Nelson |
| 8,317,080 B2 | 11/2012 | Kingston |
| 8,469,256 B2 | 6/2013 | Babb |
| 8,490,855 B2 | 7/2013 | Kingston |
| 8,550,326 B2 | 10/2013 | Packer |
| 8,910,851 B2 | 12/2014 | Rosal |
| 8,955,734 B2 | 2/2015 | Steel |
| 8,967,451 B2 * | 3/2015 | Messer .............. B23K 20/1255 228/2.1 |
| 9,061,370 B2 | 6/2015 | Nelson |
| 9,061,371 B2 | 6/2015 | Higgins |
| 9,242,308 B2 | 1/2016 | Peterson |
| 9,334,562 B2 | 5/2016 | Rozak |
| 9,352,425 B2 | 5/2016 | Rosal |
| 9,764,375 B2 | 9/2017 | Miles |
| 9,922,808 B2 | 3/2018 | Rozak |
| 10,211,035 B2 | 2/2019 | Rozak |
| 10,465,266 B2 | 11/2019 | Tsuji |
| 10,727,032 B2 | 7/2020 | Rozak |
| 11,440,133 B2 | 9/2022 | Liu |
| 11,458,564 B2 | 10/2022 | Fleck |
| 11,821,790 B2 | 11/2023 | Miguel Sánchez |
| 2003/0075584 A1 | 4/2003 | Sarik |
| 2005/0006439 A1 | 1/2005 | Packer |
| 2005/0051602 A1 | 3/2005 | Babb |
| 2005/0142005 A1 | 6/2005 | Traylor |
| 2006/0032333 A1 | 2/2006 | Steel |
| 2006/0032891 A1 | 2/2006 | Flak |
| 2006/0049234 A1 | 3/2006 | Flak |
| 2006/0157531 A1 | 7/2006 | Packer |
| 2006/0175382 A1 | 8/2006 | Packer |
| 2006/0255094 A1 | 11/2006 | Taylor |
| 2007/0057015 A1 | 3/2007 | Colligan |
| 2007/0119276 A1 | 5/2007 | Liu |
| 2007/0187465 A1 | 8/2007 | Eyre |
| 2008/0029578 A1 | 2/2008 | Steel |
| 2009/0260299 A1 | 10/2009 | Liu |
| 2009/0294514 A1 | 12/2009 | Babb |
| 2010/0038407 A1 | 2/2010 | Keshavan |
| 2010/0038408 A1 | 2/2010 | Keshavan |
| 2010/0071961 A1 | 3/2010 | Steel |
| 2010/0078224 A1 | 4/2010 | Steel |
| 2011/0127311 A1 | 6/2011 | Peterson |
| 2011/0172802 A1 | 7/2011 | Babb |
| 2012/0055977 A1 | 3/2012 | Steel |
| 2012/0227546 A1 | 9/2012 | Allen |
| 2012/0273555 A1 | 11/2012 | Flak |
| 2012/0285826 A1 | 11/2012 | Rozak |
| 2013/0062395 A1 | 3/2013 | Nelson |
| 2013/0206818 A1 | 8/2013 | Higgins |
| 2013/0228612 A1 | 9/2013 | Higgins |
| 2013/0264373 A1 | 10/2013 | Miyazaki |
| 2013/0299561 A1 | 11/2013 | Higgins |
| 2014/0008418 A1 | 1/2014 | Steel |
| 2014/0151438 A1 | 6/2014 | Fleck |
| 2015/0041521 A1 | 2/2015 | Matsushita |
| 2015/0258628 A1 | 9/2015 | Flak |
| 2016/0196961 A1 | 7/2016 | Rozak |
| 2016/0332252 A1 | 11/2016 | Obaditch |
| 2017/0191148 A1 | 7/2017 | Tsuji |
| 2017/0197274 A1 | 7/2017 | Steel |
| 2017/0216961 A1 | 8/2017 | Utter |
| 2018/0099349 A1 | 4/2018 | Packer |
| 2018/0190476 A1 | 7/2018 | Rozak |
| 2019/0061046 A1 | 2/2019 | Fleck |
| 2019/0061048 A1 | 2/2019 | Fleck |
| 2019/0151982 A1 | 5/2019 | Rosal |
| 2019/0214237 A1 | 7/2019 | Rozak |
| 2019/0337087 A1 | 11/2019 | Liu |
| 2020/0381225 A1 | 12/2020 | Rozak |

FOREIGN PATENT DOCUMENTS

| | | |
|---|---|---|
| EP | 3141625 A1 | 3/2017 |
| JP | H07206417 | 8/1995 |
| JP | H07299752 | 11/1995 |
| JP | H04004025 U | 12/1995 |
| JP | 2000225511 | 8/2000 |
| JP | 2000301361 | 10/2000 |
| JP | 2002096183 | 4/2002 |
| JP | 2003136256 | 5/2003 |
| JP | 2003326372 | 11/2003 |
| JP | 2003532542 | 11/2003 |
| JP | 2004276054 | 10/2004 |
| JP | 2006136945 A | 6/2006 |
| JP | 2008110371 | 5/2008 |
| JP | 2009543696 A | 12/2009 |
| JP | 2011140060 | 7/2011 |
| JP | 2012139694 | 7/2012 |
| JP | 2015515373 | 5/2015 |
| JP | 2016055350 | 4/2016 |
| JP | 2017022425 A | 1/2017 |
| JP | 2017203217 A | 11/2017 |
| JP | 2021523010 | 9/2021 |
| WO | 0185385 | 11/2001 |
| WO | 2013089177 | 6/2013 |
| WO | 2017070725 | 5/2017 |
| WO | 2017135401 | 8/2017 |

OTHER PUBLICATIONS

Cadem, Diamond tools (PCD tools)—why they cannot cut steel, May 26, 2016, available at https://cadem.com/why-diamond-tools-cannot-cut-steel/.

Extended European Search Report issued in corresponding European Patent Application No. 19796432.3, issued Jun. 4, 2021, 9 pages.

Extended European Search Report, issued in related European Patent Application No. 18191115.7, issued on Feb. 1, 2019, 7 pages.

International Search Report and Written Opinion issued in related International Application No. PCT/US/2019/030533, mailed Jul. 15, 2019, 10 pages.

Mohan and Wu, A Review on Friction Stir Welding of Steels, Chinese Journal of Mechanical Engineering, (2021) 34:137, 2 FSW Tools for Joining Steels. Accessed on Mar. 15, 2022 at the following link: https://cjme.springeropen.com/articles/10.1186/s10033-021-00655-3#ref-CR20.

Notice of Reasons for Refusal, issued in related Japanese Patent Application No. 2018-160482, dated Oct. 6, 2022, 8 pages.

R. Rai et al. "Review: friction stir welding tools," Science and Technology of Welding and Joining, vol. 16, No. 4, published May 1, 2011, (pp. 325-342).

Reiter, Brier, and Bleicher, Machining of Iron-Carbon Alloys by the Use of Poly-Crystalline Diamond Cutting Inserts with Internal Cooling, Journal of Manufacturing and Materials Processing, 2018, 5, 57, Introduction, published Aug. 31, 2018, available at https://www.mdpi.com/2504-4494/2/3/57/pdf.

Search Report by Registered Search Organization, issued in related Japanese Patent Application No. 2018-160482, dated Sep. 26, 2022, 21 pages.

U.S. Appl. No. 60/573,703, filed May 24, 2014, 6 pages.

(56) References Cited

OTHER PUBLICATIONS

Notice of Reasons for Refusal, issued in related Japanese Patent Application No. 2018-160482, dated Apr. 25, 2023, 13 pages.
Office Action, issued in Japanese Application No. 2020-561814, dated Feb. 28, 2023, 13 pages.

* cited by examiner

DEVICES, SYSTEMS, AND METHODS FOR INCREASED WEAR RESISTANCE DURING LOW TEMPERATURE FRICTION STIR PROCESSING

CROSS-REFERENCE TO RELATED APPLICATIONS

This application is a continuation of U.S. patent application Ser. No. 16/115,195, filed on Aug. 28, 2018, which claims the benefit of U.S. Provisional Patent Application No. 62/552,769, filed on Aug. 31, 2017, which are hereby incorporated by reference in their entireties.

BACKGROUND

Friction stir processing ("FSP") of metals has been used to attach weldable materials to one another in a solid state joining process. FSP uses the motion of a pin pressed against the surface of a weldable material to generate heat and friction to move the weldable material. The material can plasticize and physically stir together with a second material to which the first material is joined. A pin, a pin and shoulder, or another "FSP tool" may be rotated in contact with a workpiece. A force is applied to the FSP tip to urge the FSP tool against the workpiece. The FSP tool is moved along the workpiece to stir the material of the workpiece. The physical process of mixing material from two plates joins the plates.

FSP joins weldable materials in a solid-state process that avoids many of the potential defects of other welding processes. For example, FSP produces a stirred region along the path of the tool that is generally indistinguishable from the original material. FSP may be performed without the inclusion of an additional material or use of shield gasses. Some welding methods, such as metal-inert gas ("MIG") welding, may introduce an additional material to create a bond. Other welding methods, such as tungsten-inert gas ("TIG") welding, may use a non-consumable contact point to heat one or more workpieces. However, the heating may cause the one or more workpieces to attain a liquid phase and risk a phase change in the one or more workpieces. A phase change may compromise the integrity of the bond and, potentially, the workpiece, itself. To limit the possibility of a phase change or other reaction, TIG welding and similar processes utilize an inert gas "shield" around the contact area.

FSP may, therefore, provide more controllable bonds in various applications. The predictability of FSP may be desirable during the manufacturing and/or assembly of structures or devices that experience high forces during use in environments or applications in which the structure or device may be inaccessible by operators.

SUMMARY

In some embodiments, a method of friction stir processing (FSP) includes contacting a first workpiece with a FSP tool, where the first workpiece is a low-melting temperature metal or alloy and the FSP tool is a single-body FSP tool having a diamond working surface. The method also includes rotating the FSP tool in contact with the first workpiece at an interface and generating thermal energy at the interface to heat the first workpiece. The method further includes conducting thermal energy away from the interface with the FSP tool, and friction stirring the first workpiece at a temperature of the FSP tool below 800° C.

In other embodiments, a FSP device includes a single body tool formed in a single pressing process in a high temperature, high pressure press. The single body tool has a rotational axis and at least a shank and a pin. The pin is integrally formed with the shank, where the pin and at least a portion of the shank include polycrystalline diamond.

In yet other embodiments, a FSP device includes a single body tool formed in a single pressing process in a high temperature, high pressure press. The single body tool has a rotational axis and at least a shank and a pin without a shoulder connected to the pin or shank. The pin is integrally formed with the shank, where the pin and at least a portion of the shank include polycrystalline diamond.

This summary is provided to introduce a selection of concepts that are further described in the detailed description. This summary is not intended to identify key or essential features of the claimed subject matter, nor is it intended to be used as an aid in limiting the scope of the claimed subject matter.

Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for increasing the wear resistance of a friction stir processing (FSP) tool for friction stir welding, joining, processing, or other friction stirring procedures. More specifically, this disclosure relates to the design, manufacture, and use of polycrystalline diamond (PCD) FSP tools for increased operational lifetime and increased efficiency during the FSP of low melting temperature alloys. For example, a PCD FSP tool may be used to FSP single phase low melting temperature alloys at higher axial loads and higher rotational speeds than a conventional tool steel FSP tool due at least partially to the lower coefficient of friction and/or higher thermal conductivity of PCD relative to tool steel. The lower coefficient of friction and/or higher thermal conductivity of PCD may allow lower temperatures of the workpiece and the FSP tool at equivalent axial loads and rotational rates of a conventional tool steel FSP tool. A PCD FSP tool may, therefore, operate at higher axial loads and/or higher rotational speeds than a conventional tool steel FSP tool without melting the workpiece, without damaging the FSP tool, with a smaller heat affected zone, or combinations thereof.

In some embodiments, the increased rotational rate and/or axial loads may produce greater amounts of movement of the workpiece material. In some examples, the FSP tool may rotate in contact with the workpiece and frictionally drag the workpiece material to flow the workpiece material in substantially circular motion with the rotation of the FSP tool work surface. In other examples, the FSP tool may include one or more surface features on a pin and/or a shoulder that mechanically engage with the workpiece material to flow the workpiece material. The increased rotational rate and/or axial load may flow a greater amount of material. The increased flow rate may produce a stronger weld and/or allow increased translational speeds across the workpiece surface to complete a weld in less time.

In other embodiments, the lower coefficient of friction and greater thermal conductivity may allow FSP with a PCD FSP tool at lower temperatures of the FSP tool below the graphitization temperature and/or oxidation temperature of the PCD. For example, PCD may oxide in the presence of oxygen above a temperature of 700° Celsius (C). Even during FSP in an inert environment, such as in a closed container or gas shielding with an inert gas, diamond is metastable and may graphitize at elevated temperatures.

Figure 1:
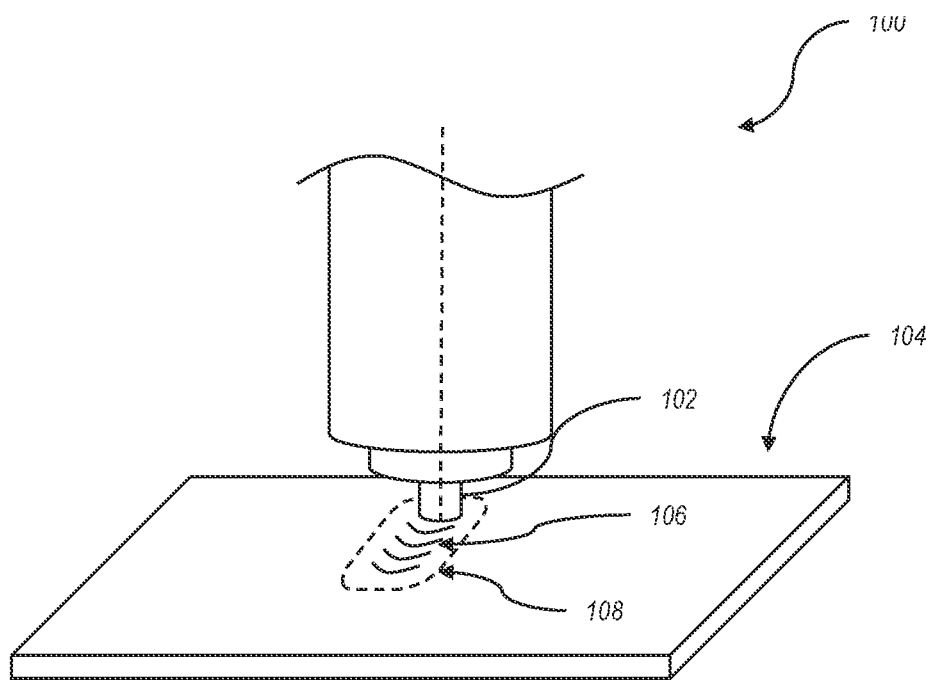
FIG. 1 is a perspective view of an embodiment of a friction stir processing system, according to at least one embodiment of the present disclosure.

FIG. 1 illustrates an embodiment of a FSP system 100 with a FSP tool 102 in contact with a workpiece 104. Rotation of the FSP tool 102 in contact with the workpiece 104 may stir the workpiece 104 in a stirred zone 106 and create a heat affected zone 108 beyond the stirred zone 106. In some embodiments, FSP may refer to the stirring of a workpiece 104 to refine the grain structure in the stirred zone 106 and/or the heat affected zone 108 of the workpiece material. For example, the crystalline structure of the workpiece material may be at least partially dependent on the manufacturing of the workpiece. The as-manufactured grain structure may be undesirable for a finished part.

In some examples, a cast workpiece may have a random orientation (i.e., no texture) with a relatively large grain size with little to no deformation within each grain. FSP of the cast aluminum may refine the grain size to produce a smaller average grain size (increasing the boundary density of the microstructure). FSP of the cast aluminum may further produce internal strain within the grains. Increases in one or both of the grain boundary density and the internal strain may increase the hardness of the aluminum.

In other examples, an extruded or rolled workpiece may exhibit a preferred orientation to the grain structure (e.g., a <101> texture or a <001> texture, respectively in aluminum) that may be undesirable in the finished part. For example, an extruded texture in an aluminum rod may increase the mechanical wear rate of the aluminum when used as an axle. FSP of the aluminum may mechanically alter the grain structure of the aluminum rod and/or remove the extruded texture of the rod surface. Orientation textures may affect other mechanical or chemical properties of the workpiece, such as anisotropic hardness or toughness, or oxidation rates.

Figure 2:
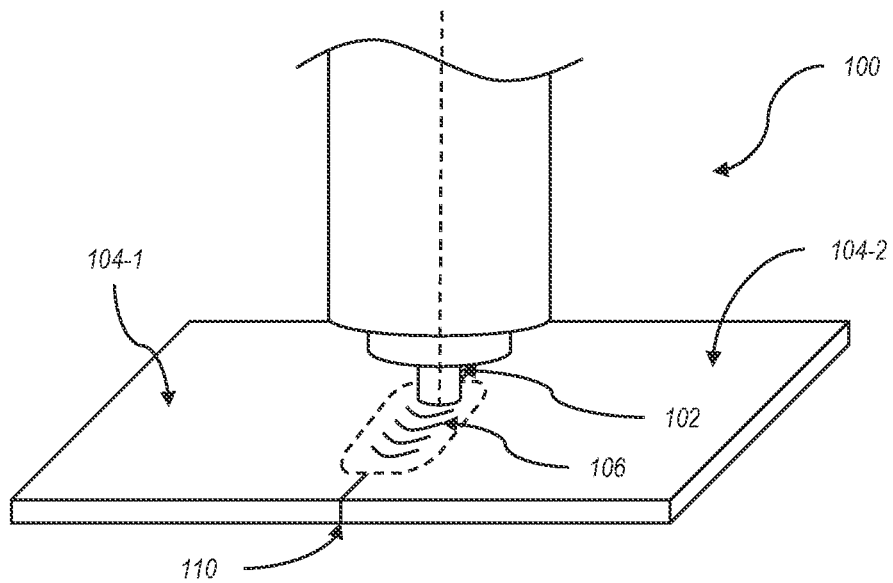
FIG. 2 is a perspective view of an embodiment of a friction stir processing system welding a butt joint, according to at least one embodiment of the present disclosure.

In other embodiments, FSP may refer to friction stir welding of a first workpiece to a second workpiece. For example, FIG. 2 illustrates the FSP system 100 and FSP tool of FIG. 1 stir welding a butt joint. A first workpiece 104-1 may be positioned contacting a second workpiece 104-2 in a butt joint 110, and the first workpiece 104-1 and second workpiece 104-2 may be joined along the butt joint 110 by FSP. The FSP tool 102 may flow first workpiece material and second workpiece material in a circular direction and substantially perpendicular to the butt joint 110 in the stirred zone 106 to transfer material between the first workpiece 104-1 and second workpiece 104-2, mechanically joining the first workpiece 104-1 and second workpiece 104-2 along the butt joint 110.

Stir welding is a solid state joining process that plastically moves material of the first workpiece 104-1 and second workpiece 104-2 to interlock the first workpiece 104-1 and second workpiece 104-2 at a microstructural level. In some embodiments, the first workpiece 104-1 and second workpiece 104-2 may be the same material. For example, the first workpiece 104-1 and the second workpiece 104-2 may be both an AA 6065 aluminum alloy. In other embodiments, the first workpiece 104-1 and second workpiece 104-2 may be different materials. For example, the first workpiece 104-1 may be a single-phase aluminum alloy, and the second workpiece 104-2 may be a single-phase copper alloy. In other examples, the first workpiece 104-1 may be an AA 6063 aluminum alloy and the second workpiece 104-2 may be an AA 7075 aluminum alloy.

Stir welding through FSP of low melting temperature metal workpieces with a PCD FSP tool may exhibit superior weld properties with less wear on the FSP tool and/or in less time. In some embodiments, a low melting temperature metal or metal alloy may be a single-phase metal or metal alloy. For example, a single-phase metal or metal alloy may have a primary phase that is greater than 98% of the material by volume. In other examples, a single-phase metal or metal alloy may have a primary phase that is greater than 99% of the material by volume. In yet other examples, a single-phase metal or metal alloy may have a primary phase that is approximately 100% of the material by volume.

Figure 3:
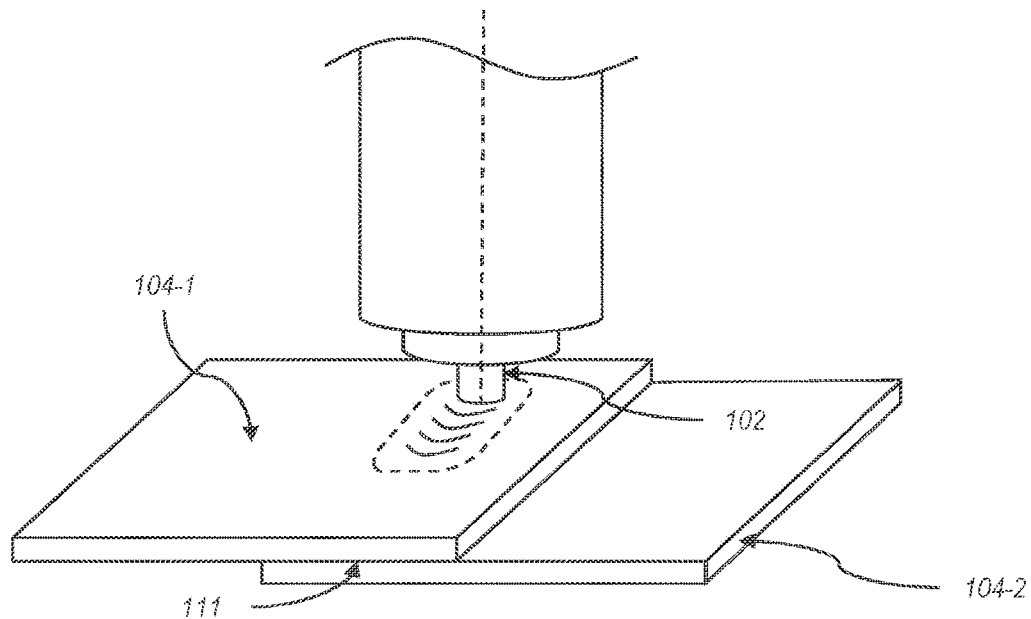
FIG. 3 is a perspective view of an embodiment of a friction stir processing system welding a lap joint, according to at least one embodiment of the present disclosure.

In yet another embodiment, stir welding by FSP may include friction stirring of a first workpiece and a second workpiece adjacent one another in a lap joint, such as the embodiment illustrated in FIG. 3. The FSP tool 102 may be positioned contacting a surface of the first workpiece 104-1 and the FSP tool 102 may be plunged into the first workpiece 104-1 and, optionally, the second workpiece 104-2 to plastically move first workpiece material and second workpiece material to interlock the first workpiece 104-1 and the second workpiece 104-2 at the lap joint 111.

In some embodiments, a lap joint weld by FSP may require greater axial loads than a butt joint weld. A lap joint weld may produce a joint with a thickness greater than a butt joint, as the workpieces are overlaid on one another. The lap joint, therefore, may dissipate heat slower than a thin butt joint, increasing the possibility of damage to the weld and/or the FSP tool by elevated temperatures. A PCD FSP tool may conduct thermal energy from the weld region faster than a conventional tool steel FSP tool, allowing welding of thicker joints and/or with deeper plunge of the FSP tool while remaining below 800° C.

Figure 4:
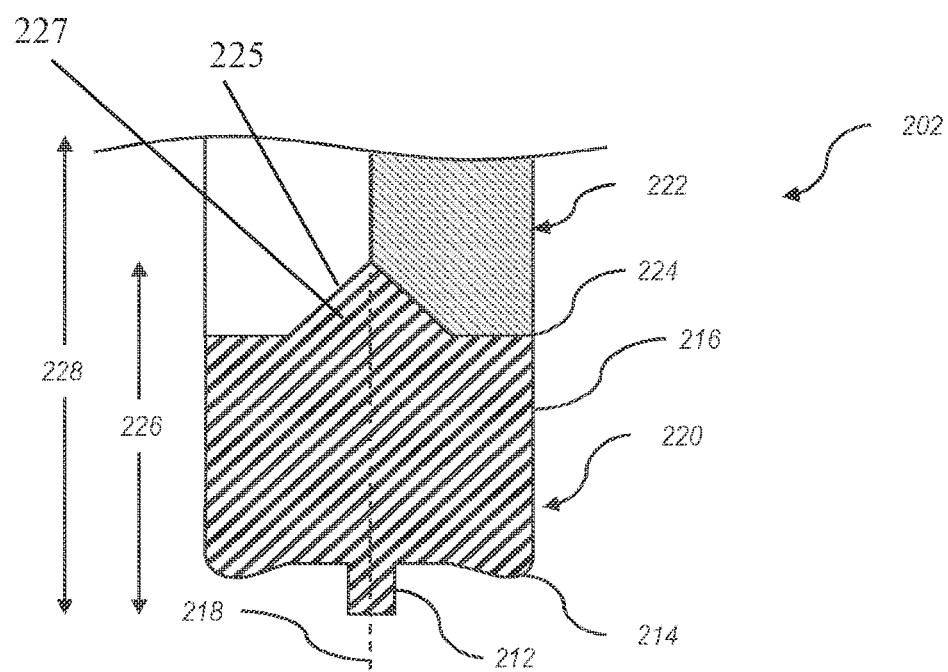
FIG. 4 is a side cross-sectional view of an embodiment of a friction stir processing tool, according to at least one embodiment of the present disclosure.

FIG. 4 is a side cross-sectional view of an embodiment of a FSP tool 202, according to the present disclosure. In some embodiments, the FSP tool 202 may have a single-body construction. The FSP tool 202 may have a pin 212, a shoulder 214, and a shank 216 that are integrally formed with one another. For example, the FSP tool 202 may be formed in a HPHT press in a single press to form the entire pin 212, shoulder 214, and shank 216. In some examples, the FSP tool 202 may be formed in a press at temperature greater than 1400° C. and pressures greater than 5.0 GPa.

In some embodiments, the pin 212, shoulder 214, and at least a portion of the shank 216 are each formed from PCD. For example, the pin 212, shoulder 214, and a portion of the shank 216 in the longitudinal direction along a longitudinal axis 218 of the FSP tool 202 are integrally formed from PCD 220. In other words, the pin 212, shoulder 214, and a portion of the shank 216 are microstructurally bonded. For instance, microstructures of one part (e.g., the pin 212) may be bonded to microstructures of another part (e.g., the shoulder 214). In some embodiments, the pin 212, shoulder 214, and a portion of the shank 216 are monolithically formed (e.g., share a continuous microstructure). Parts may be integrally formed by a single pressing at high temperature and high pressure. For example, the pin 212, shoulder 214, and a portion of the shank 216 may be pre-formed and put into a press. The FSP tool 202 is rotatable around the longitudinal axis 218.

In some embodiments, a second material 222 of the shank 216 may be integrally formed with the PCD 220 though not monolithically formed (as the second material is not PCD). In at least one example, the second material 222 may be a carbide, such as tungsten carbide. In at least one other example, the second material 222 may be a dual phase material with a metal matrix to provide additional toughness to the shank 216. In FIG. 4, the second material 222 has a recess 225 and the PCD 220 has an axial protrusion 227 extending into and engaging the recess 225.

The PCD 220 may be continuous from the pin 212 in the longitudinal direction to a boundary 224 with the second material 222. In some embodiments, a PCD length 226 from the end of the pin 212 to the boundary 224 may be relative to the total length 228 of the FSP tool 202. The PCD length 226 may be in a range having an upper value, a lower value, or an upper and lower value including any of 5%, 10%, 15%, 20%, 25%, 30%, 40%, 45%, 50%, 60%, 70%, 80%, 90%, 100% of the total length 228, or any values therebetween. For example, the PCD length 226 may be greater than 5% of the total length 228 of the FSP tool 202. In another example, the PCD length 226 may be greater than 10% of the total length 228 of the FSP tool 202. In yet another example, the PCD length 226 may be greater than 15% of the total length 228 of the FSP tool 202. In at least one example, at least a portion of the PCD 220 may extend the total length 228 of the FSP tool 202.

Figure 5:
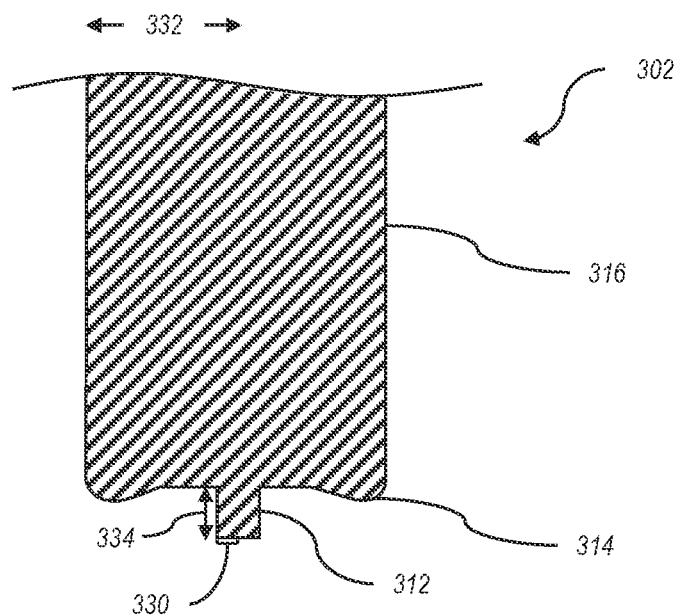
FIG. 5 is a side cross-sectional view of another embodiment of a friction stir processing tool, according to at least one embodiment of the present disclosure.

FIG. 5 is a cross-sectional view of an embodiment of a single body FSP tool 302 with a monolithic construction. In other embodiments, the FSP tool may be 100% PCD. For example, the FSP tool 302 may include a pin 312, a shoulder 314, and a shank 316 formed from a single monolithic piece of PCD. A monolithic PCD body may be substantially uniform through the FSP tool 302.

In some embodiments, a monolithic PCD FSP tool 302 may allow for greater thermal conductivity than a FSP tool with a second material and/or boundary between materials. For example, the PCD may have a thermal conductivity greater than 500 Watts/meter-Kelvin. In other examples, the PCD may have a thermal conductivity greater than 600 Watts/meter-Kelvin. In yet other examples, the PCD may have a thermal conductivity greater than 700 Watts/meter-Kelvin. In at least one example, the PCD may have a thermal conductivity greater than 1000 Watts/meter-Kelvin. A second material, such as a carbide, may have a lower coefficient of thermal conductivity, reducing the overall thermal conductivity of the FSP tool 302 and the ability of the FSP tool 302 to operate at temperatures below the oxidation temperature of the PCD and the melting temperature of the workpiece. A boundary, such as that described in relation to FIG. 4, may cause phonon scattering across the boundary, reducing the overall thermal conductivity of the FSP tool 302.

In some embodiments, the thermal conductivity and wear resistance of a PCD FSP tool according to the present disclosure may allow for more aggressive movement of material during FSP operations. For example, a FSP tool according to the present disclosure may include a larger pin than a conventional FSP tool. In some embodiments, the pin 312 may be a substantially cylindrical pin, such as shown in FIG. 5. In other embodiments, the pin 312 may be a tapered pin. In yet other embodiments, the pin 312 may be a stepped pin. For example, the pin 312 may be a series of stacked cylinders or truncated cones. A pin 312 according to the present disclosure may have a base radius 330 where the pin 312 meets the shoulder 314 and/or shank 316 that is at least 10% of a total radius 332 of the FSP tool 302. In some embodiments, the base radius 330 may be a percentage of the total radius 332 in a range having an upper value, a lower value, or upper and lower values including any of 10%, 20%, 30%, 40%, 50%, or any values therebetween. In some examples, the base radius 330 may be greater than 10% of the total radius 332. In other examples, the base radius 330 may be less than 50% of the total radius 332. In yet other examples, the base radius 330 may be between 10% and 50% of the total radius 332. In further examples, the base radius may be between 25% and 50% of the total radius 332. In at least one example, the base radius may be about ⅓ of the total radius 332.

In other embodiments, the base radius may be in a range having an upper value, a lower value, or upper and lower values including any of 1 millimeters (mm), 2 mm, 5 mm, 10 mm, 20 mm, 30 mm, 40 mm, 50 mm, or any values therebetween. In some examples, the base radius 330 may be greater than 1 mm. In other examples, the base radius 330 may be less than 50 mm. In yet other examples, the base radius 330 may be between 1 mm and 50 mm. In further examples, the base radius 330 may be between 2 mm and 40 mm. In yet further examples, the base radius 330 may be between 5 mm and 35 mm.

In some embodiments, the pin 312 may have a pin length 334 in the longitudinal direction that is relative to the total radius 332 of the FSP tool 302. The pin length 334 may be in a range having an upper value, a lower value, or an upper and lower value including any of 5%, 10%, 15%, 20%, 25%, 30%, 40%, 45%, 50%, 60%, 70%, 80%, 90%, 100% of the total radius 332, or any values therebetween. For example, the pin length 334 may be greater than 10% of the total radius 332. In another example, the pin length 334 may be greater than 25% of the total radius 332. In yet another example, the pin length 334 may be greater than 50% of the total radius 332. In some embodiments, the pin length 334 in a range having an upper value, a lower value, or upper and lower values including any of 1 millimeters (mm), 2 mm, 5 mm, 10 mm, 20 mm, 30 mm, 38.1 mm, or any values therebetween. In some examples, the pin length 334 may be greater than 1 mm. In other examples, the pin length 334 may be less than 38.1 mm. In yet other examples, the pin length 334 may be between 1 mm and 38.1 mm. In further examples, the pin length 334 may be between 2 mm and 30 mm. In yet further examples, the pin length 334 may be between 5 mm and 25 mm.

Figure 6:
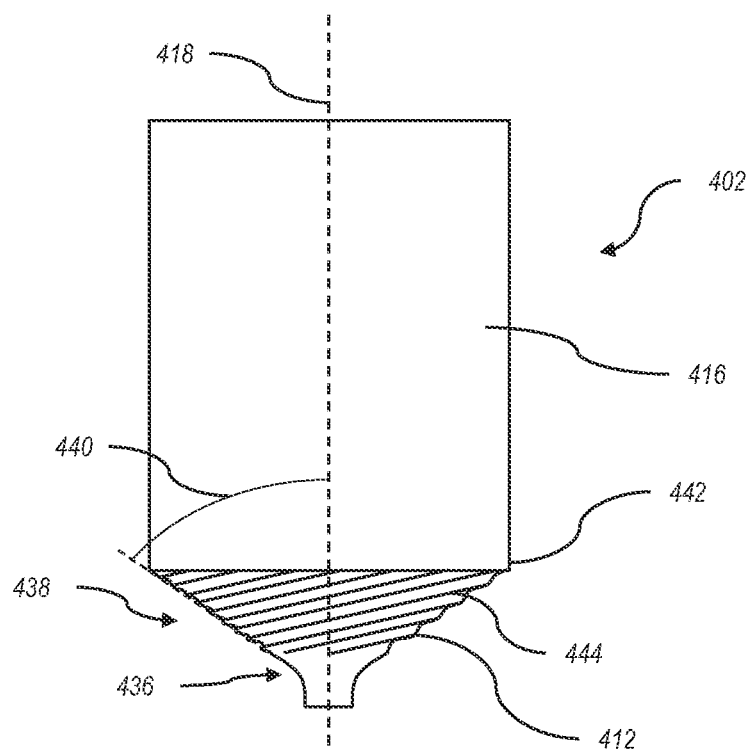
FIG. 6 is a side view of yet another embodiment of a friction stir processing tool, according to at least one embodiment of the present disclosure.

FIG. 6 is a side view of yet another embodiment of a FSP tool 402 according to the present disclosure. In some embodiments, a FSP tool 402 may include a pin 412 and a shank 416, without a shoulder. The pin 412 and at least a portion of the shank 416 may be integrally and/or monolithically formed of PCD, as described, for example, above.

FIG. 6 illustrates a FSP tool 402 with a tapered pin 412. In some embodiments, the pin 412 may have a pin profile that is linear. In other embodiments, the pin 412 may have a pin profile that is curved. In yet other embodiments, the pin may have a pin profile with a portion that is curved and a portion that is linear. For example, the embodiment of a pin 412 illustrated in FIG. 6 includes a pin profile with a curved portion 436 and a linear portion 438.

In embodiments with at least a portion of the pin profile being linear, the linear portion 438 of the pin profile may have an angle 440 relative to a rotational axis 418 in a range having an upper value, a lower value, or an upper and lower value including any of 30° C., 40° C., 45° C., 50° C., 60° C., 75° C., 80° C., 85° C., 90° C., or any values therebetween. For example, a linear portion 438 may be oriented at an angle 440 greater than 30° C. In other examples, the linear portion 438 may be oriented at an angle 440 less than 90° C. In yet other examples, the linear portion 438 may be oriented an angle 440 between 30° C. and 90° C. In further examples, the linear portion 438 may be oriented at an angle between 45° C. and 75° C. In at least one example, the linear portion 438 may be oriented at an angle of 60° C. to the rotational axis 418. In some embodiments without a shoulder, the pin 412 may have a width that is the total width of the FSP tool 402. The pin 412 may continue to a sidewall 442 of the FSP tool 402.

In some embodiments, a pin 412 may include one or more pin surface features 444 to increase the movement of workpiece material during rotation of the pin 412. For example, FIG. 6 illustrates an embodiment of a pin 412 with a spiral pin surface feature 444 to urge material in the stirred zone to circulate toward the radial center of the stirred zone instead of displacing radially away from the FSP tool 402. Such a pin surface feature 444 may be beneficial in a butt friction stir weld to reduce and/or prevent thinning of the workpiece material in the weld zone. The spiral pin surface feature 444 in combination with the angle 440 of the linear portion 438 and/or curved portion 436 of the pin profile, may circulate workpiece material downward toward within the stirred region, as well. Such a pin surface feature 444 may be beneficial in a lap friction stir weld to encourage stirred workpiece material from the first workpiece toward the second workpiece to form the lap joint.

Figure 7:
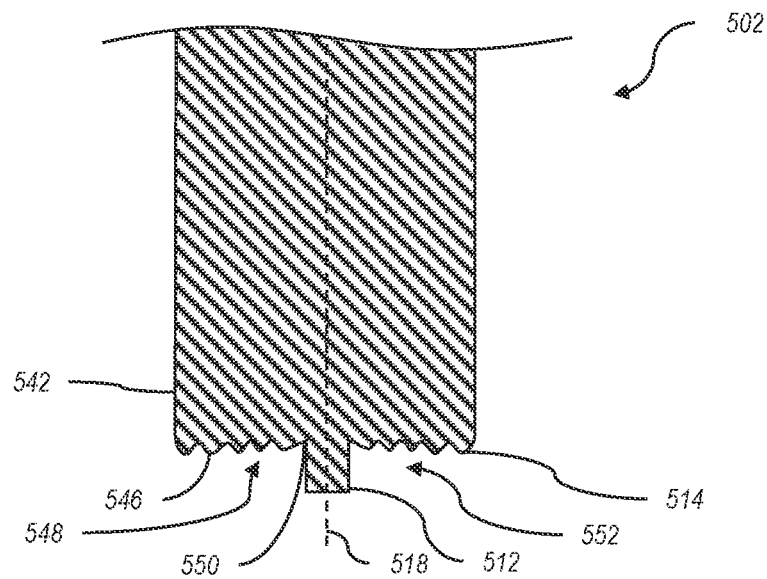
FIG. 7 is a side cross-sectional view of a further embodiment of a friction stir processing tool, according to at least one embodiment of the present disclosure.

FIG. 7 illustrates another embodiment of a PCD FSP tool 502 according to the present disclosure. The FSP tool 502 has a pin 512 and a shoulder 514, with shoulder surface features 546 positioned on the shoulder 514. A shoulder 514 of the FSP tool 502 may be a portion of the working surface 548 within a sidewall 542 that is radially outside (e.g., further from the rotational axis 518) and including a minimum 550 (a point furthest from the end of the pin 512 in the longitudinal direction) in the working surface profile 552. For example, the embodiment illustrated in FIG. 6 includes a continuously sloping pin profile from the rotational axis to the sidewall. The pin 512 continues radially outward to the minimum 550, and the shoulder 514 includes the minimum 550 radially outward to the sidewall 542.

FIG. 7 illustrates a set of concentric circular shoulder surface features 546 positioned on the shoulder 514 of the FSP tool 502. In some embodiments, concentric circular shoulder surface features 546 may limit the radial displacement of workpiece material during FSP operations. In other embodiments, concentric circular shoulder surface features 546 may work in conjunction with spiral pin surface features, such as that described in relation to FIG. 6, or other pin surface features to limit the radial displacement of workpiece material radially outside the circulation encouraged by the pin surface features. In yet other embodiments, other shoulder surface features 546 may encourage the movement of workpiece material during rotation of the shoulder 514.

Figure 8:
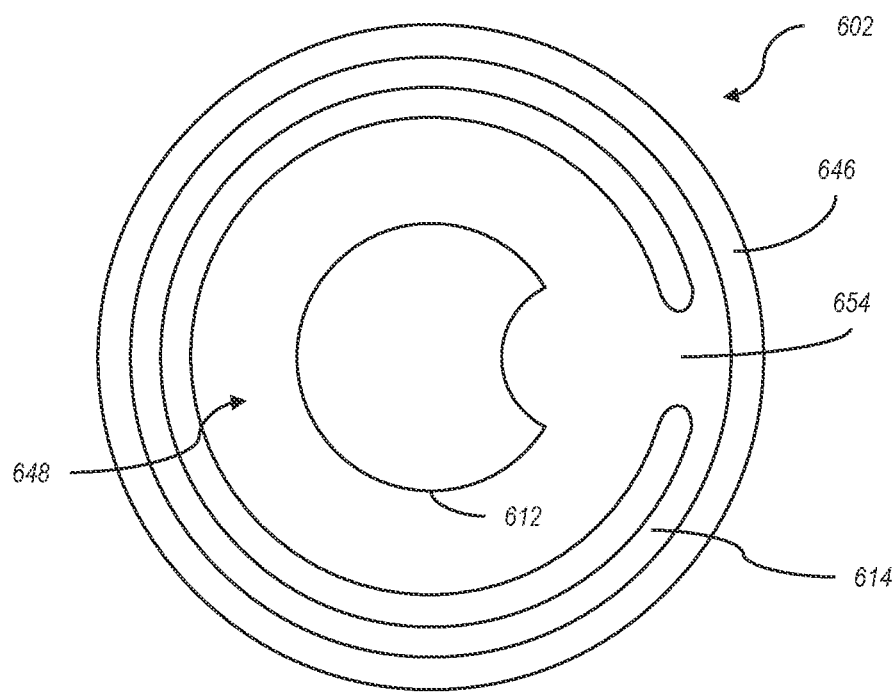
FIG. 8 is an end view of an embodiment of a working surface of a friction stir processing tool, according to at least one embodiment of the present disclosure.

FIG. 8 is a perspective end view of an embodiment of a FSP tool 602 with a variety of surface features thereon. Pin surface features 644 and shoulder surface features 646 may include protrusions, recesses, fins, pockets, dimples, bumps, waves, ridges, or other local surface variations in the radial direction and/or the rotational direction of the working surface 648. The shoulder 614 may include a shoulder surface feature 646 that varies in the rotational direction, in the radial direction, in the longitudinal direction, or combinations thereof. For example, a shoulder surface feature 646 may include a circular ridge where the longitudinal position of the working surface 648 varies in the radial direction and is constant in the rotational direction, such as shown in FIG. 8. In other examples, a shoulder surface feature 646 may include a longitudinal variation in the rotational direction, such as the break 654 in the circular ridge in the rotational direction.

In some embodiments, the pin 612 may include one or more pin surface features 644. For example, the pin 612 may include a pin surface feature 644 that varies in the rotational direction, in the radial direction, in the longitudinal direction, or combinations thereof. A pin surface feature 644 may include a recess where the longitudinal position of the working surface 648 is constant in the radial direction and varies in the rotational direction. In other examples, a shoulder surface feature 646 may include a longitudinal variation in the rotational direction, such as the break 654 in the circular ridge in the rotational direction.

Figure 9:
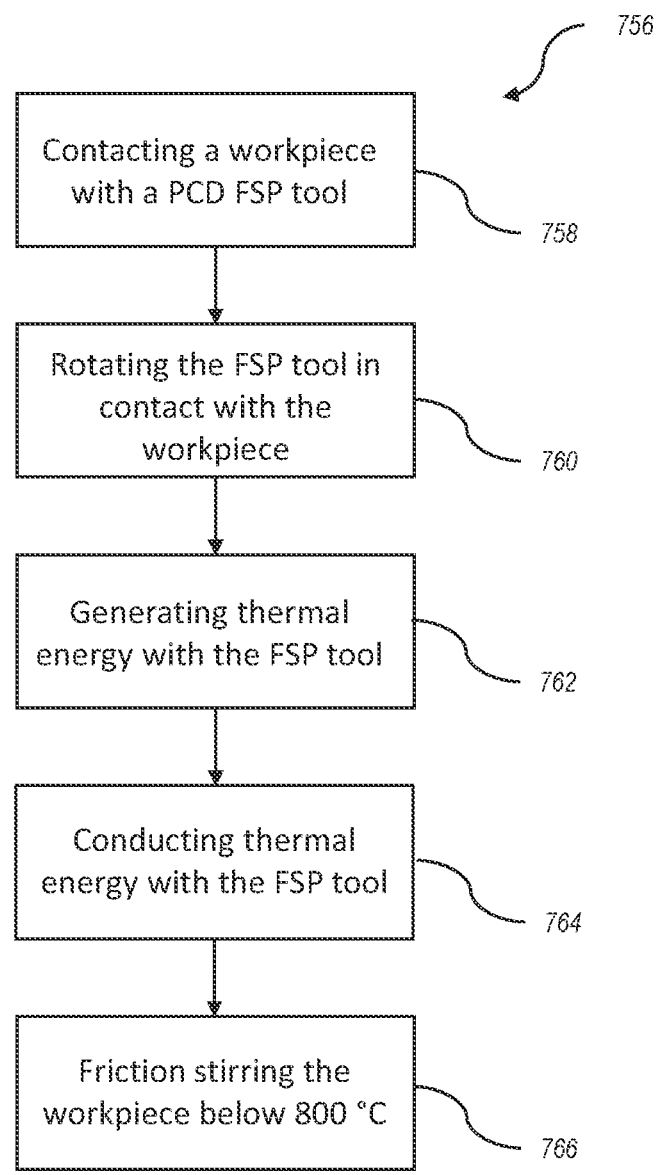
FIG. 9 is a flowchart illustrating an embodiment of a method, according to at least one embodiment of the present disclosure.

FIG. 9 is a flowchart illustrating an embodiment of a method 756 of friction stir processing low melting temperature metals or alloys. The method 756 may include contacting a first workpiece with a FSP tool at 758. The first workpiece is a low melting temperature metal or alloy and the FSP tool is a single-body FSP tool having at least a diamond working surface, according to the present disclosure.

The method 756 may further include rotating the FSP tool in contact with the first workpiece at an interface at 760 and generating thermal energy at the interface to heat the first workpiece and the FSP tool at 762. In some embodiments, a rotational speed of the FSP tool may be in a range having an upper value, a lower value, or upper and lower values including any of 10 revolutions per minute (RPM); 50 RPM; 100 RPM; 500 RPM; 1,000 RPM; 5,000 RPM; 10,000 RPM; 20,000 RPM; 30,000 RPM; or any values therebetween. In some examples, the rotational speed may be greater than 10 RPM. In other examples, the rotational speed may be less than 30,000 RPM. In yet other examples, the rotational speed may be between 10 RPM and 30,000 RPM. In further examples, the rotational speed may be between 50 RPM and 20,000 RPM. In yet further examples, the rotational speed may be between 100 RPM and 15,000 RPM.

In some embodiments, the FSP tool may be held in the starting position until sufficient thermal energy is generated. For example, translation of the FSP tool across the surface of the workpiece(s) may begin after the workpiece and/or FSP tool attain an initial temperature. In some embodiments, the initial temperature may be in a range having an upper value, a lower value, or upper and lower values including any of 400° C., 450° C., 500° C., 550° C., 600° C., 650° C., 700° C., 750° C., 800° C., or any values therebetween. For example, the initial temperature may be greater than 400° C. In other examples, the initial temperature may be less than 800° C. In yet other examples, the initial temperature may be between 400° C. and 800° C. In further examples, the initial temperature may be between 450° C. and 750° C.

The method further includes conducting the thermal energy away from the interface with the FSP tool at 764 and friction stirring the first workpiece at a temperature of the FSP tool below 800° C. at 766.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A friction stir processing tool rotatable around a central rotational axis, the friction stir processing tool comprising:
    a single body monolithically formed of polycrystalline diamond;
    a shoulder of the single body extending transverse to the central rotational axis;
    a lower pin of the single body extending downwardly from the shoulder;
    the lower pin having a lowermost end and a side surface extending around the pin;
    a discontinuity in the side surface of the lower pin;
    a working surface of the shoulder extending around the lower pin;
    an arcuate ridge extending downwardly from the working surface of the shoulder and extending less than 360 degrees around the lower pin, the arcuate ridge having opposite ends with a spacing therebetween;
    the discontinuity in the side surface of the lower pin facing radially outward toward the spacing in a radial direction between the opposite ends of the arcuate ridge;
    an upper surface portion of the single body opposite the lower pin, the upper surface portion extending transverse to the central rotational axis;
    the single body having a total length extending along the central rotational axis from the lowermost end of the lower pin to the upper surface portion of the single body; and
    the polycrystalline diamond extends the total length of the single body tool.

2. The friction stir processing tool of claim 1 wherein the single body includes:

a side surface of the polycrystalline diamond extending upwardly from the shoulder toward the upper surface portion.

3. The friction stir processing tool of claim 1 wherein the single body includes a shank portion of the polycrystalline diamond configured to be received in a tool holder.

4. The friction stir processing tool of claim 1 wherein the single body comprises:
  a shank of the polycrystalline diamond extending upwardly from the shoulder and having an upper end including the upper surface portion.

5. The friction stir processing tool of claim 1 wherein the single body includes:
  a side surface of the polycrystalline diamond extending between the shoulder and the upper surface portion;
  an upper juncture of the upper surface portion and the side surface portion, the upper surface portion extending inward from the upper juncture toward the central rotational axis; and
  a lower juncture of the shoulder and the side surface.

6. The friction stir processing tool of claim 5 wherein the single body has a first maximum width perpendicular to the central rotational axis at the upper juncture and a second maximum width perpendicular to the central rotational axis at the lower juncture that is the same as the first maximum width.

7. The friction stir processing tool of claim 1 wherein the upper surface portion is flat.

8. The friction stir processing tool of claim 1 wherein the side surface of the pin includes one or more ridges.

9. The friction stir processing tool of claim 1 wherein the polycrystalline diamond has a thermal conductivity of greater than 500 Watts/meter-Kelvin.

10. The friction stir processing tool of claim 1 wherein the polycrystalline diamond has a coefficient of friction of less than 0.1.

11. The friction stir processing tool of claim 1 wherein the single body is formed in a pressing process at a temperature greater than 1400 degrees Celsius and at a pressure greater than 5.0 GPa.

12. The friction stir processing tool of claim 1 wherein the friction stir processing tool is configured to weld a workpiece at a temperature of the tool less than 800 degrees Celsius, the workpiece being a low-melting temperature metal or alloy.

13. The friction stir processing tool of claim 1 wherein the friction stir processing tool is configured to weld an aluminum alloy workpiece.

14. The friction stir processing tool of claim 1 wherein the side surface of the pin has corners at either side of the discontinuity.

15. The friction stir processing tool of claim 1 wherein the side surface includes a first side surface portion and a second side surface portion at opposite sides of the discontinuity, the first side surface portion having a first radius from the central rotational axis and the second side surface portion having a second radius from the central rotational axis; and
  wherein the discontinuity includes a third side surface portion intermediate the first and second side surface portions around the pin, the third side surface portion having a third radius from the central rotational axis that is less than the first radius and is less than the second radius.

16. The friction stir processing tool of claim 15 wherein the first radius and the second radius are the same.

17. The friction stir processing tool of claim 1 wherein the side surface includes first and second surface portions at opposite sides of the discontinuity, the first and second surface portions having the same shape; and
  wherein the discontinuity includes a third surface portion connecting the first and second surface portions and having a different shape than the first and second surface portions.

* * * * *